(12) United States Patent
Haartsen et al.

(10) Patent No.: US 10,917,799 B2
(45) Date of Patent: Feb. 9, 2021

(54) CENTRAL CONTROL FOR WIRELESS DEVICE DENSITY OPTIMIZATION

(71) Applicant: Plantronics, Inc., Santa Cruz, CA (US)

(72) Inventors: Jacobus Cornelis Haartsen, Rolde (NL); Catelyn Gifford Orsini, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/270,514

(22) Filed: Feb. 7, 2019

(65) Prior Publication Data

US 2020/0260298 A1 Aug. 13, 2020

(51) Int. Cl.
| | |
|---|---|
| *H04W 24/02* | (2009.01) |
| *H04W 76/25* | (2018.01) |
| *H04W 4/80* | (2018.01) |
| *H04W 76/16* | (2018.01) |
| *H04W 24/10* | (2009.01) |

(52) U.S. Cl.
CPC ............ *H04W 24/02* (2013.01); *H04W 4/80* (2018.02); *H04W 24/10* (2013.01); *H04W 76/16* (2018.02); *H04W 76/25* (2018.02)

(58) Field of Classification Search
CPC ....... H04W 24/02; H04W 76/25; H04W 4/80; H04W 76/16; H04W 24/10
USPC .............................................. 455/41.1–41.3
See application file for complete search history.

(56) References Cited

U.S. PATENT DOCUMENTS

| | | |
|---|---|---|
| 9,699,741 B1 | 7/2017 | Chu et al. |
| 2004/0224650 A1 | 11/2004 | Hundal et al. |
| 2009/0154388 A1 | 6/2009 | Jalloul et al. |
| 2010/0022263 A1 | 1/2010 | Stamoulis et al. |
| 2011/0110340 A1* | 5/2011 | Lakkis ................. H04W 74/08 370/336 |
| 2014/0094183 A1* | 4/2014 | Gao .................... H04W 72/048 455/450 |
| 2016/0323922 A1* | 11/2016 | Park ..................... H04W 24/10 |

(Continued)

OTHER PUBLICATIONS

International Search Report and Written Opinion issued in corresponding International Application No. PCT/US2020/016940 dated May 25, 2020 (27 pages).

*Primary Examiner* — Yuwen Pan
*Assistant Examiner* — Angelica M Perez
(74) *Attorney, Agent, or Firm* — Chuang Intellectual Property Law

(57) ABSTRACT

Methods and apparatuses for managing user density in wireless communications are described. In one example, a method includes receiving at a central controller device a plurality of link data associated with a plurality of wireless links between a plurality of first communication devices and a plurality of second communication devices. The method includes identifying a global system performance from the plurality of link data utilizing a link quality parameter. The method further includes, responsive to the global system performance, generating one or more modified link settings for a first wireless link between a first communication device and a second communication device. The method further includes transmitting from the central controller device to the first communication device or the second communication device the one or more modified link settings for the first wireless link for implementation at the first communication device and/or the second communication device.

30 Claims, 10 Drawing Sheets

(56) References Cited

U.S. PATENT DOCUMENTS

| | | | |
|---|---|---|---|
| 2017/0142535 A1* | 5/2017 | Aggarwal | H04S 3/008 |
| 2017/0245166 A1* | 8/2017 | Bienas | H04W 72/085 |
| 2019/0150001 A1* | 5/2019 | Jen | H04L 41/12 |
| | | | 455/446 |
| 2019/0174557 A1* | 6/2019 | Ueda | H04R 3/12 |

* cited by examiner

CENTRAL CONTROL FOR WIRELESS DEVICE DENSITY OPTIMIZATION

BACKGROUND OF THE INVENTION

In enterprise applications, achievable user density in wireless audio communications (including voice communications) is an important figure of merit for systems using Bluetooth Classic, Bluetooth derivatives such as Bluetooth Low Energy (BLE), Digital European Cordless Telecommunications (DECT), and other similar packet-based radio systems. One factor adversely impacting achievable user density is interference. For example, since the first release of the standard in 1999, the Bluetooth wireless technology has seen a major uptake for use in short-range communications. Making use of unlicensed spectrum in the 2.4 GHz ISM band, Bluetooth must share the spectrum with other users, including other Bluetooth users.

In a typical enterprise usage scenario, numerous base devices (also referred to herein as base stations) are located within a building space. To each base device, a single headset is connected, together forming an independent piconet. The headsets are scattered around the base devices. A frequent topic of discussion is the density of users that can be achieved without noticeable interference, with higher user density naturally being the goal. In Bluetooth, audio is compressed and sent in a series of short packets to the receiver. A packet may be interfered by packets from other Bluetooth transmitters, or by signals from other transmitters in the ISM band. The quality of the wireless connection may be determined by the Bit-Error-Rate (BER) or Packet-Error-Rate (PER) experienced at the wireless receiver.

Scenarios where user density is an issue are interference-limited. In an interference-limited scenario, the available Carrier-to-Interference ratio (C/I) experienced at the receiver is dominated by the accumulated interference produced by the other users sharing the same area and spectrum. The experienced C/I ratio is a local parameter and is determined by the distance between the receiver and its transmitter (determining the intended received carrier signal power C) and the distance to active, nearby interfering transmitters, together creating the (unwanted) interfering power I. The quality of the link expressed in BER or PER is inversely proportional to the C/I ratio. The C/I ratio is usually considered to be a statistical parameter. The system is said to be loaded to its full capacity when 95% or more of the users experience a PER of 1% or less. This is a rather subjective boundary. More strict requirements can be set (like 99% or more of the users experience a PER of 0.1% or less), but this will reduce the number of active users in a fully loaded system.

Modern wireless systems can be reconfigured on the fly to give the best performance under different circumstances. The modulation and coding schemes can be adapted to provide higher or lower data rates with more or less protection against interference. Furthermore, different audio codec rates can be applied, impacting audio quality, interference robustness, but also the required channel capacity. Lastly, packet intervals can be changed to adapt the duty cycle; the latter may affect the latency though.

As an example, in a relative quiet environment, the wireless system may use the highest modulation scheme without error correction schemes, a high-rate audio codec for optimal audio performance, and a low duty cycle for low latency. This will require quite some channel capacity, but in a quiet environment, the capacity does not have to be shared among a lot of users. If the number of users increases, the (limited) spectral capacity needs to be divided among more users, creating also more mutual interference.

In the prior art, each headset and base station makes local measurements related to interference conditions and makes local decisions how to respond based on these measurements. This individualized, distributed control may lead to undesirable situations: during a quiet period, greedy users may grab the capacity in the area for high-quality, wide bandwidth codecs. Users arriving later may experience a lot of interference and are forced to use a low-quality, narrowband codec. So, the capacity is not evenly distributed among users.

As a result, improved methods and apparatuses for managing user density in wireless audio communications are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
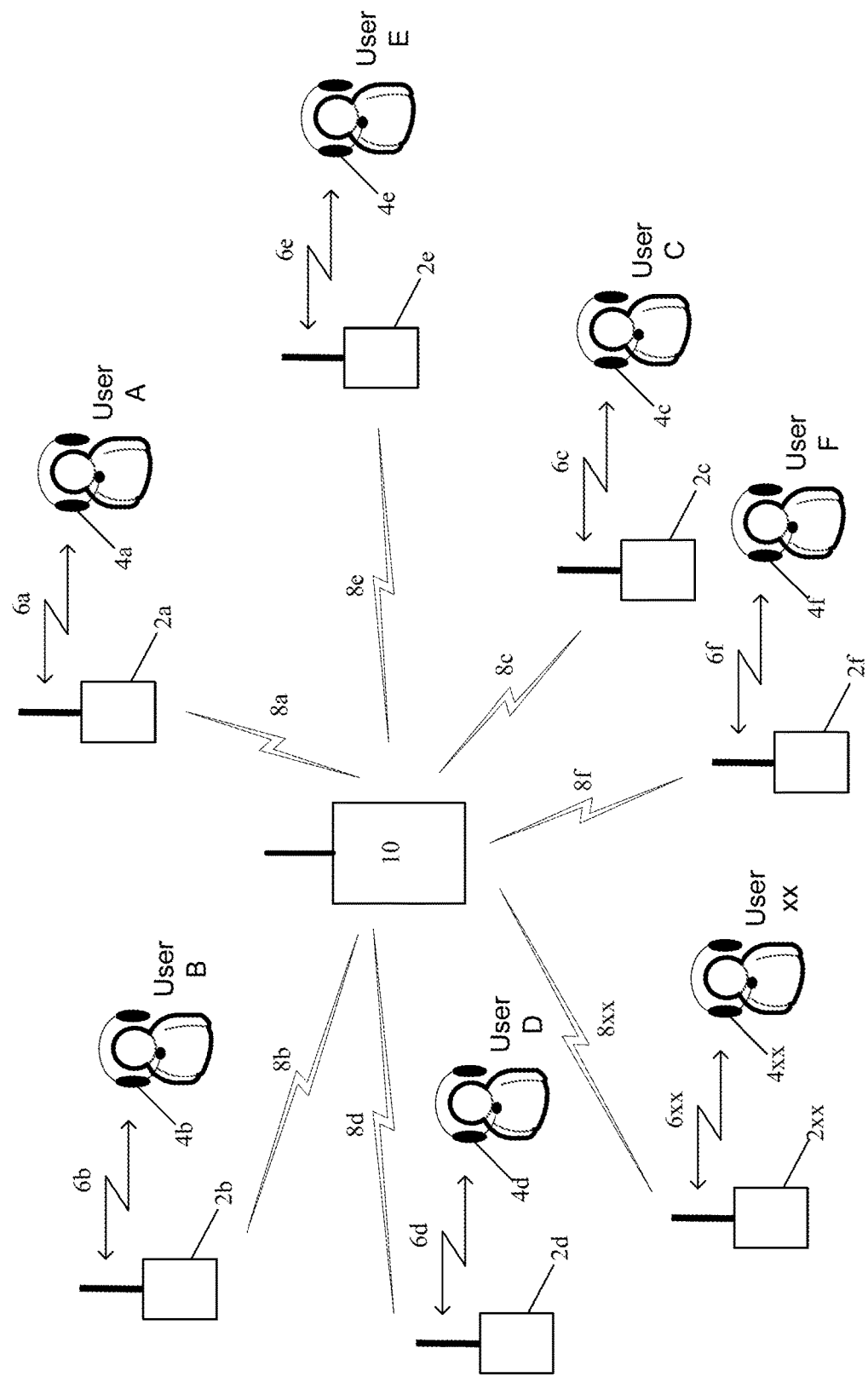
FIG. 1 illustrates a radio communication system with multiple base stations and client devices.

Methods and apparatuses for optimizing link settings to manage user density in wireless audio communications are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

The inventors have recognized certain limitations in current methods and apparatuses for managing user density in wireless audio communications. In one example embodiment of the invention, a method for wireless link management includes receiving at a central controller device a plurality of link data associated with a plurality of wireless links between a plurality of first communication devices and a plurality of second communication devices. In one embodiment, the first communication devices are base stations and the second communication devices are client devices. The method includes identifying a global system performance from the plurality of link data utilizing a link quality parameter. The method further includes, responsive to the global system performance, generating one or more modified link settings for a first wireless link between a first communication device and a second communication device. The first communication device is selected from the plurality of first communication devices and the second communication device is selected from the plurality of second communication devices. The method further includes transmitting from the central controller device to the first communication device or the second communication device the one or more modified link settings for the first wireless link for implementation at the first communication device or the second communication device.

In one example embodiment, a system includes a central controller device and a first communication device. The central controller device includes a central controller processor, a central controller wireless transceiver, a central controller antenna, and a central controller memory storing one or more system link management applications executable by the central controller processor. The one or more system link management applications include instructions to (a) receive a plurality of link data associated with a plurality of wireless links between a plurality of first communication devices and a plurality of second communication devices, (b) identify a global system performance from the plurality of link data utilizing a link quality parameter, and (c) responsive to the global system performance, generate one or more modified link settings for one or more wireless links in the plurality of wireless links.

The first communication device selected from the plurality of first communication devices includes a first communication device processor, and one or more first communication device wireless transceivers configured for wireless communications with the central controller device and a second communication device, the second communication device included in the plurality of second communication devices. In one embodiment, the first communication device is a base station and the second communication device is a client device. The first communication device further includes a first communication device antenna, and a first communication device memory storing one or more first communication device link management applications executable by the first controller processor.

The one or more first communication device link management applications include instructions to (a) transmit a first wireless link data to the central controller device, the first wireless link data associated with a first wireless link between the first communication device and the second communication device, wherein the first wireless link data is included in the plurality of link data received at the central controller device, (b) receive from the central controller device one or more modified link settings for the first wireless link between the first communication device and the second communication device, (c) implement the one or more modified link settings at the first communication device, and (d) transmit a data between the first communication device and the second communication device over the first wireless link utilizing the one or more modified link settings.

In one example embodiment of the invention, a method for wireless link management includes transmitting a first wireless link data to a central controller device, the first wireless link data associated with a first wireless link between a first communication device and a second communication device, wherein the first wireless link data is included in a plurality of link data received at the central controller device. The method includes receiving from the central controller device one or more modified link settings for the first wireless link between the first communication device and the second communication device, the one or more modified link settings generated responsive to identifying a global system performance from the plurality of link data. The method further includes implementing the one or more modified link settings at the first communication device, and transmitting a data between the first communication device and the second communication device over the first wireless link utilizing the one or more modified link settings.

In one example embodiment of the invention, in order to optimize both user density and audio quality, a central controller is utilized with a system of headsets and base stations. All transceivers (i.e., all headsets and base stations) are in contact with the central controller. Each headset has a short-range radio link to its corresponding base station. This link can be based on Bluetooth (Classic or LE), DECT, WiFi, or another wireless technology. In addition to the mutual link, each headset and/or base station has a low-rate connection to the central controller. In one embodiment, the headset has no direct connection to the central controller but conveys the relevant data to its base station which in turn forwards this to the central controller, together with its own information. This low-rate connection could, for example, be based on the Bluetooth Low-Energy Long-Range mode (peak rate of 125 kb/s but with a link budget 13 dB better than ordinary Bluetooth LE) that could cover the entire floor. The overhead is provided for the connections to the central controller. Reporting intervals may be several minutes or longer. The dynamics are determined by the rate new calls are initiated and ongoing calls are released.

Each headset and/or base station can inform the central controller of its current conditions, including (a) RSSI value (indicating how much intended power is received), (b) interference experienced (e.g. by providing BER and PER information), (c) interference power received in other parts of the spectral band (i.e. on carrier frequencies not used for the current connection between headset and base station), (d) currently used modulation scheme, coding scheme, audio codec type, and other link parameters used on the link between the headset and the base station, and (e) audio quality metrics like PESQ/POLQA/MOS.

By gathering this information from all headsets and base stations, the central controller determines the overall performance of the system as a whole. A distribution is created, showing how many users experience acceptable link quality. For example, a cumulative distribution function is generated as the result of the data gathered in the central controller. The cumulative distribution function shows the distribution of PER over the different (local) links between headsets and base stations.

In a further embodiment, the data collected in the central controller is also used for monitoring the system over time, creating a labeled data set for which machine learning and/or other big data techniques are applied to give indications how to adjust the link parameters for optimal performance as well as other nonobvious insights. Specifically, system performance is advantageously improved by the central controller that collects environmental, device setting, and audio quality statistical data. The system employs statistical calculations and/or more comprehensive machine learning techniques to determine and deploy the configuration to individual transceivers in order to improve the overall density and communication quality. Additionally, assuming a separate cloud-based audio analytics system that is deployed to monitor audio quality through MOS (mean opinion score) or other audio perceptual model, the data in the central controller is used to map the PER or other link quality metrics to validate the thresholding in the model. This then provides an offline way to label the data set from the central controller with more comprehensive and computationally intensive audio quality analytics. This offline learning can be used to update the link management application that runs locally on the on the base and/or client device.

FIG. 1 illustrates a radio communication system with multiple base stations $2a$, $2b$, $2c$, $2d$, $2e$, $2f$ . . . $2xx$ and client devices $4a$, $4b$, $4c$, $4d$, $4e$, $4f$ . . . $4xx$. There are respective wireless links $6a$, $6b$, $6c$, $6d$, $6e$, $6f$ . . . $6xx$ between base stations $2a$, $2b$, $2c$, $2d$, $2e$, $2f$ . . . $2xx$ and client devices $4a$, $4b$, $4c$, $4d$, $4e$, $4f$ . . . $4xx$. For example, wireless links $6a$, $6b$, $6c$, $6d$, $6e$, $6f$ . . . $6xx$ are short-range wireless links and may, for example, be Bluetooth communications links, Digital Enhanced Cordless Telecommunications (DECT) links, or IEEE 802.11 (WiFi) links.

Central controller device 10 is capable of wireless communications with base stations $2a$, $2b$, $2c$, $2d$, $2e$, $2f$ . . . $2xx$ and client devices $4a$, $4b$, $4c$, $4d$, $4e$, $4f$ . . . $4xx$ utilizing respective wireless links $8a$, $8b$, $8c$, $8d$, $8e$, $8f$ . . . $8xx$. In one embodiment, each client device conveys the relevant data to its base station which in turn forwards this to the central controller device 10, together with the base station's own information. For example, wireless links $8a$, $8b$, $8c$, $8d$, $8e$, $8f$ . . . $8xx$ are low-rate connections based on the Bluetooth Low-Energy Long-Range mode (peak rate of 125 kb/s but with a link budget 13 dB better than ordinary Bluetooth LE) that could cover the entire floor. Reporting intervals may be several minutes or longer. The dynamics are determined by the rate new calls are initiated and ongoing calls are released.

The radio communication system may, for example, be implemented in a telephone call center or an office environment having a high density of users. A base station $2a$ is configured to establish a wireless link $6a$ with a client device $4a$ (e.g., a wireless headset or other user wearable mobile device) used by User A. Base station $2a$ transmits data communications packets to and receives data communications packets from the client device $4a$ at User A over the wireless link $6a$. In one example, the radio communication system is a Bluetooth system, where the base station $2a$ is a Bluetooth base station and the client device $4a$ is a Bluetooth headset. The wireless link $6a$ is a Bluetooth protocol connection. In a further example, the radio communication system is a DECT system, where the base station $2a$ is a DECT base station and the client device $4a$ is a DECT headset. As used herein the term "DECT" refers to devices operating according to the standard for Digital European Cordless Telecommunications, including the Digital Enhanced Cordless Telecommunications standard used in North America. The DECT links may operate in either the 1880-1900 MHz frequency band or the 1920-1930 MHz frequency band.

A second base station $2b$ from the plurality of base stations is configured to establish a second wireless link $6b$ with a second client device $4b$ used by a User B. The second base station $2b$ transmits data communications packets to and receives data communications packets from the second client device $4b$ over the second wireless link $6b$. Base stations $2c$, $2d$, $2e$, $2f$ . . . $2xx$ and client devices $4c$, $4d$, $4e$, $4f$ . . . $4xx$ utilized by User C, User D, User E, User F, and User xx, respectively, operate in a similar manner utilizing wireless links $6c$, $6d$, $6e$, $6f$ . . . $6xx$, respectively.

A carrier frequency in a frequency band is used by a base station in radio contact with a client device. For example, a base station $2a$ transmits to a client device $4a$ in a transmit time slot in a first frame on a selected carrier frequency. The client device $4a$ transmits to the base station $2a$ in a receive time slot in a second frame on the same or different selected carrier frequency. Thus, during transmit time slots, base station $2a$ acts as a transmitter and during receive time slots base station $2a$ operates as a receiver. The first frame and the second frame taken together form a duplex frame.

In one example, the illustrated devices (e.g., Bluetooth devices) apply Adaptive Frequency Hopping (AFH). The adaptiveness comes from the fact that the master can decide to use (i.e., hop over) only a subset of carriers out of all carriers available. It is up to the manufacturers how to decide on the subset. The Bluetooth standard includes several commands at the Link Manager Protocol (LMP) level to enable AFH. AFH can be used dynamically to avoid certain static interferers like an WiFi access point. Base stations $2xx$ and/or client devices $4xx$ measure the power levels experienced on the carriers in the spectral band and may exclude certain carriers if interference on those carriers is deemed too high. The Bluetooth link will then hop around these carriers, thus avoiding carriers that may cause a lot of errors on the link. Yet, the central controller 10 may also use the AFH feature to optimize communications in the overall system. For example if user E with device $4e$ is communicating with a premium customer, it may request at the central controller 10 for a high quality link. Based on data measured in base station $2e$, base station $2e$ may identify the nearest base stations and client devices that provide the most interference, being users A and C in this case (either by measurements based on distances E-A and E-C, or RSSI measurements on the channels $6a$ and $6c$ belonging to users A and C, respectively). Based on the request from user E, central controller 10 may instruct users A and C to use a set of carriers disjunct from the set of carriers allocated to user E, using the AFH feature. In this way, user E is not sharing the spectrum with its nearest neighbors and can therefore enjoy a higher quality link.

Base stations $2a$, $2b$, $2c$, $2d$, $2e$, $2f$ . . . $2xx$ may, for example, be a landline or VOIP phone, access point (AP), personal computer, USB dongle, or mobile phone. Base stations $2a$, $2b$, $2c$, $2d$, $2e$, $2f$ . . . $2xx$ are coupled to a telecommunications network. The network may be a communications network which may include a public switched telephone network (PSTN), a cellular network, an integrated services digital network (ISDN), a local area network (LAN), and/or a wireless local area network (WLAN), that support standards such as Ethernet, 802.11, and/or voice over internet protocol (VoIP).

Base stations 2a, 2b, 2c, 2d, 2e, 2f . . . 2xx include a transceiver and a processor configured to allow a wireless device (e.g., one of the client devices 4a, 4b, 4c, 4d, 4e, 4f . . . 4xx) access to a network connected to the base station (e.g., via a 10/100 Ethernet RJ-45 port). For example, the base station may be any device that allows wireless-equipped computers and other devices to communicate with a wired network. In one example, the base stations are able to support the 802.11a, 802.11b, and/or 802.11g wireless networking standards. In other examples, the base stations may be able to support other wireless networking standards.

The transmit power of base stations and/or client devices over wireless links 6a, 6b, 6c, 6d, 6e, 6f . . . 6xx is measured and monitored over time. The transmit power measurements can be monitored either at the client device or at the base station, or both. If measured and monitored at the base station, the client device can be configured to query the base station as to the transmit power. If measured and monitored at the client device, the base station can be configured to query the client device as to the transmit power.

Figure 2A:
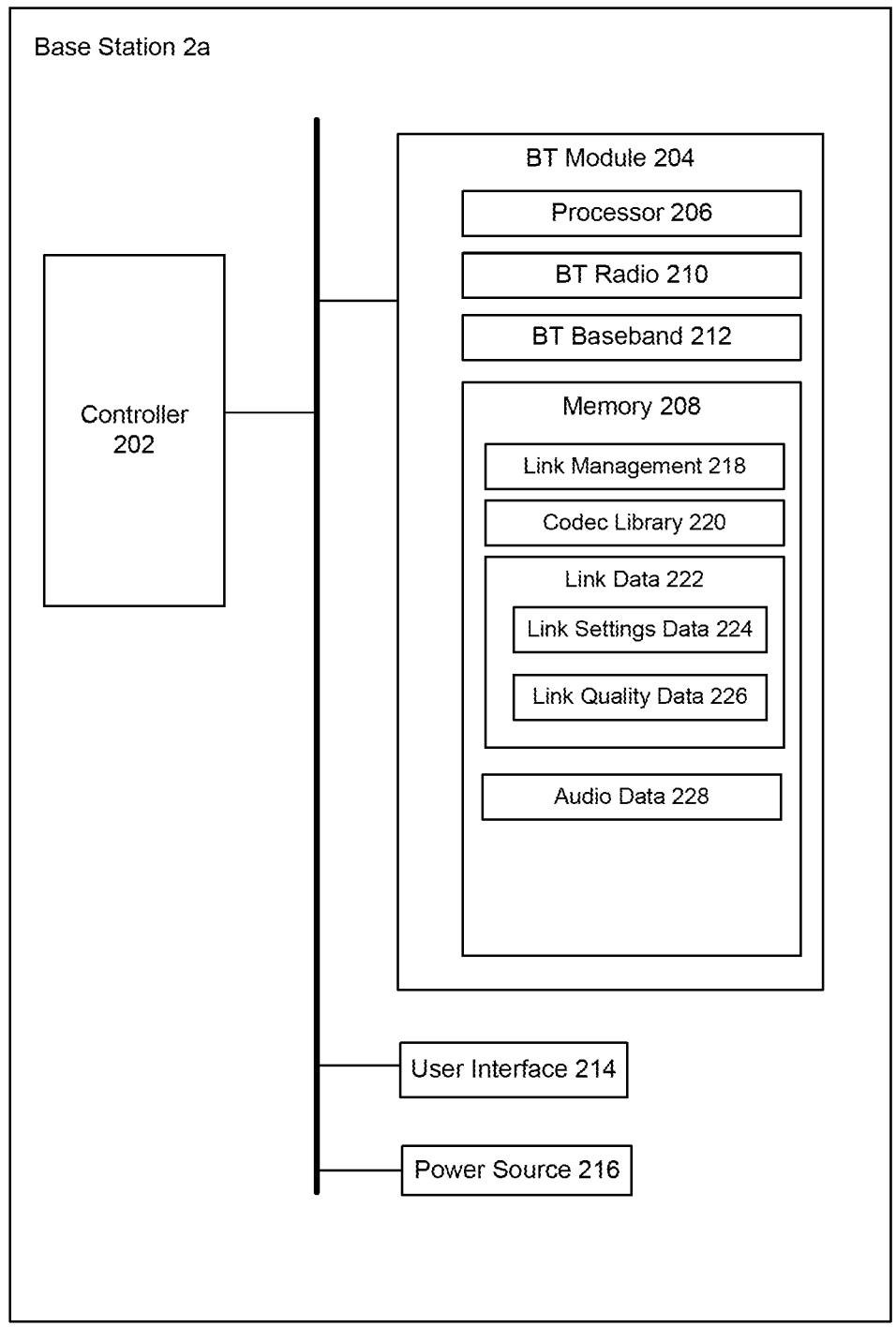
FIG. 2A illustrates a simplified block diagram of the base station shown in FIG. 1 in one example.

FIG. 2A illustrates a simplified block diagram of the base station 2a shown in FIG. 1 in one example. In a Bluetooth implementation, a base station 2a includes a controller 202, Bluetooth module 204, user interface 214, and power source 216. For example, base station 2a may be a mobile phone, headset, PDA, smartphone, portable computer, or other electronic device.

Bluetooth module 204 includes a processor 206, Bluetooth radio 210, and Bluetooth baseband 212. Bluetooth module 204 includes a memory 208 storing a link management application program 218, codec library 220 and link data 222. Link management application program 218 performs functions described herein or any other link related functions performed at base station 2a. Link data 222, such as for link 6a, includes link settings data 224 and link quality data 226. Base station 2a may modify any of the link settings based on instructions received from the central controller device 10.

For example, link settings data 224 may include (a) audio codec used, including rate (i.e. amount of compression), (b) packet type used, revealing modulation scheme, the Forward Error Correction (FEC) scheme, and the overhead (revealed by the packet length), (c) used transmit power, and (d) adaptive frequency hop parameters (i.e. over how many carriers the link hops). Link quality data 226 may include, for example, (a) RSSI value, (b) current carrier to interference (C/I) experienced, (c) packet error rate (PER) values, (d) bit error rate (BER) values, and (e) audio quality data derived from analysis of the audio itself (e.g., audio data 228). The central controller device 10 collects this data for each individual link. Based on the performance (i.e., quality) data, it can then determine a distribution function to show the percentage of users with good and bad link performance.

Codec library 220 includes codecs available for selection and use by base station 2a. In a Bluetooth implementation, available codecs may include, for example: (a) CVSD (64 kb/s), (b) mSBC (64 kb/s), and (c) mSBC (128 kb/s). In a DECT implementation, available codecs may include, for example: (a) G726 (32 kb/s) and (b) G722 (64 kb/s). In a Bluetooth implementation, packet types include HV1-HV3, EV3-EV5, 2-EV3, 2-EV5, 3-EV3, and 3-EV5.

Processor 206 executes the programs stored in memory 208. Bluetooth radio 210 includes an antenna port (not shown), and may be implemented on a separate chip. Bluetooth radio 210 may include a Bluetooth compatible transmitter modulator and a Bluetooth compatible receiver modulator. Bluetooth radio 210 is configured to transmit or receive voice or data packets via an antenna. Bluetooth radio 210 may be a dual-mode radio communicating to the client device using the Bluetooth Classic standard and communicating to the central controller using the Bluetooth Low Energy (Long Range) standard.

Processor 206 may include a variety of processors (e.g., digital signal processors), with conventional CPUs being applicable. Memory 208 may include a variety of memories, and in one example includes RAM, ROM, flash memory, or a combination thereof. Memory 208 may further include separate memory structures or a single integrated memory structure. One or more components of Bluetooth module 204 may be integrated with components at base station 2a.

Figure 2B:
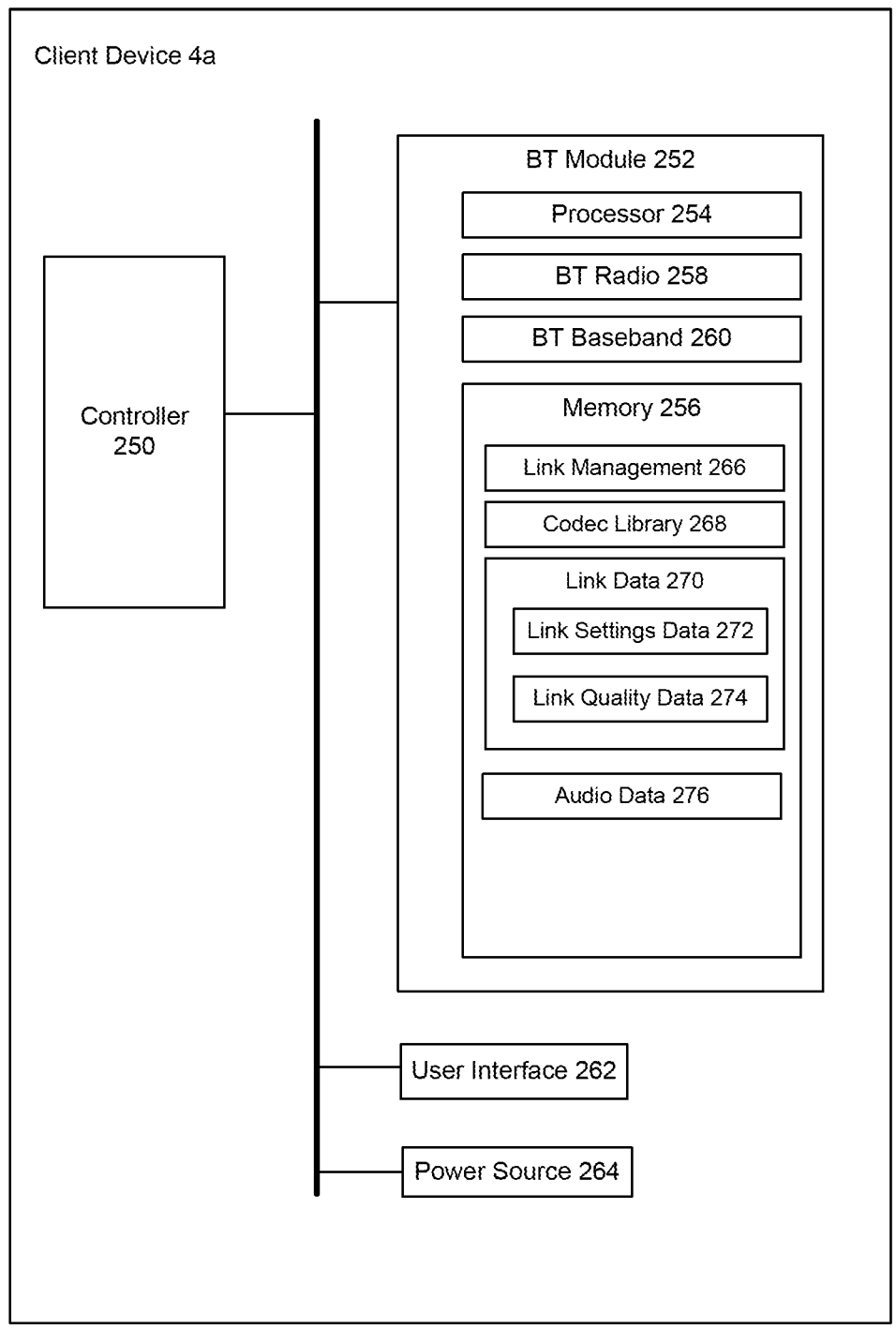
FIG. 2B illustrates a simplified block diagram of the client device shown in FIG. 1 in one example.

FIG. 2B illustrates a simplified block diagram of the client device 4a shown in FIG. 1 in one example. Bluetooth client device 4a includes a controller 250, Bluetooth module 252, user interface 262, and power source 264. Bluetooth module 252 includes a processor 254, Bluetooth radio 258, and Bluetooth baseband 260.

Bluetooth module 252 includes a memory 256 storing a link management application program 266, codec library 268, and link data 270. Codec library 268 is substantially similar to the codec library 220 described above. Link data 270 includes link settings data 272 and link quality data 274. For example, link settings data 272 may include (a) audio codec used, including rate (i.e. amount of compression), (b) packet type used, revealing modulation scheme, the Forward Error Correction (FEC) scheme, and the overhead (revealed by the packet length), (c) used transmit power, and (d) adaptive frequency hop parameters (i.e. over how many carriers the link hops). Link quality data 274 may include, for example, (a) RSSI value, (b) current carrier to interference (C/I) experienced, (c) packet error rate (PER) values, (d) bit error rate (BER) values, and (e) audio quality data derived from analysis of the audio itself (e.g., audio data 276). The central controller device 10 collects this data from each individual link.

Processor 254 executes programs stored in memory 256. Bluetooth radio 258 includes components and operates similar to Bluetooth radio 210 described above. For example, client device 4a may be a mobile phone, headset, PDA, smartphone, portable computer, or other electronic device. Link management application program 266 is capable of performing all of the functions performed by link management application program 218 or any other link related functions performed at client device 4a.

Figure 3:
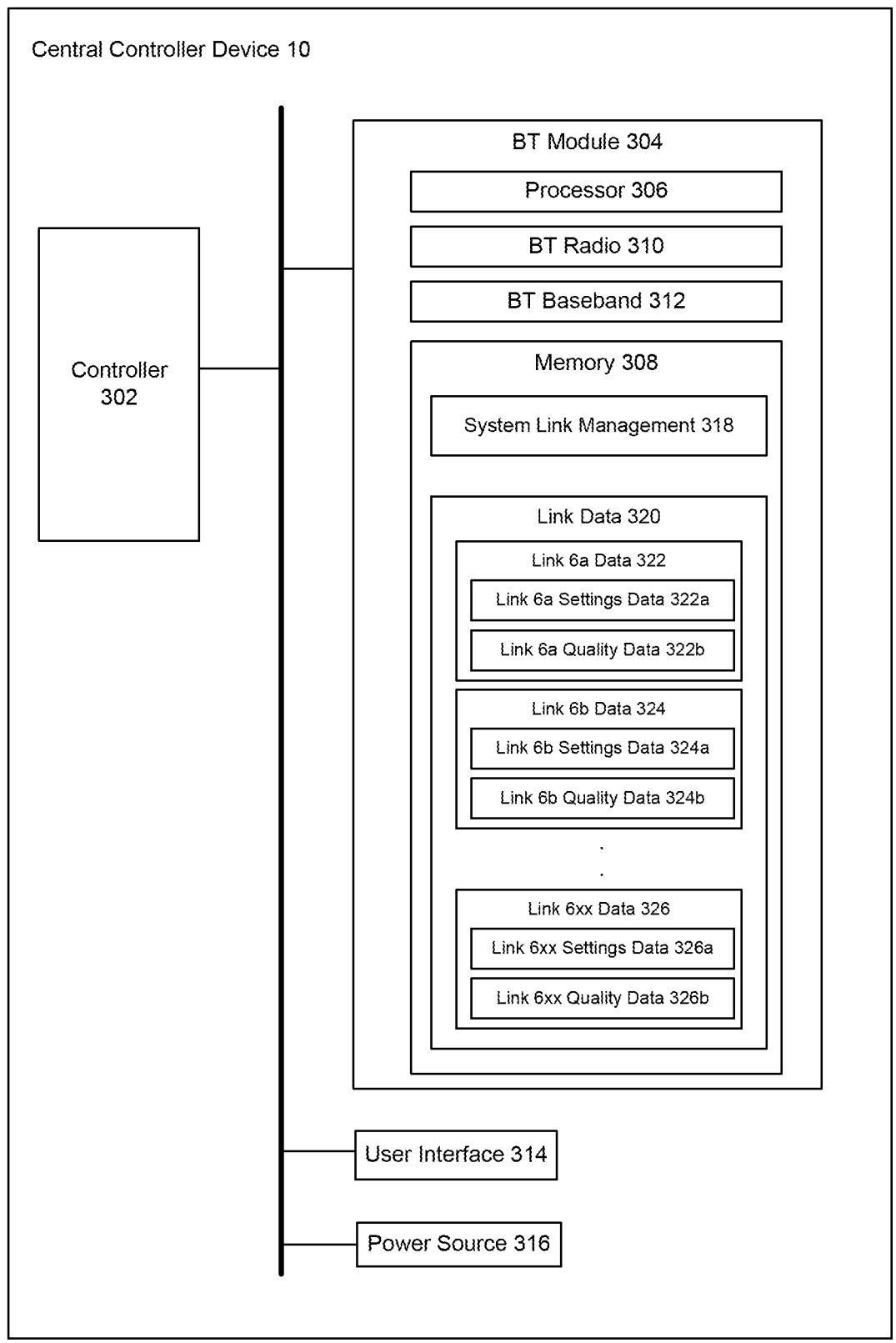
FIG. 3 illustrates a simplified block diagram of the central controller device shown in FIG. 1 in one example.

FIG. 3 illustrates a simplified block diagram of the central controller device 10 shown in FIG. 1 in one example. In a Bluetooth implementation, central controller device 10 includes a controller 302, Bluetooth module 304, user interface 314, and power source 316. For example, central controller device 10 may be a server, personal computer, or other electronic device.

Bluetooth module 304 includes a processor 306, Bluetooth radio 310, and Bluetooth baseband 312. Bluetooth module 304 also includes a memory 308. Memory 308 stores a system link management application program 318 interfacing with link management application 218 and/or link management application 266. Memory 308 further stores link data 320 received from base stations and/or client devices associated with the wireless links between the base stations and the client devices. Link data 320 includes, for example, link 6a data 322. Link 6a data 322 includes link 6a settings data 322a and link 6a quality data 322b. Link data 320 includes, for example, link 6b data 324. Link 6b data 324 includes link 6b settings data 324a and link 6b quality data 324b. Link data 320 includes all received link data, i.e., up to and including link 6xx data 326, which includes link 6xx settings data 326a and link 6xx quality data 326b. As used herein, the term link settings data includes, but is not limited to settings associated with an audio codec, a data packet type, a modulation scheme, a used transmit power, or an adaptive frequency hop parameter. Similarly, the term link quality data includes, but is not limited to a received signal strength indicator (RSSI) data, a packet error rate (PER) data, a bit error rate data (BER), or a carrier-to-interference (C/I) data.

Processor 306 executes programs stored in memory 308, including system link management application program 318. Bluetooth radio 310 includes an antenna port (not shown), and may be implemented on a separate chip. Bluetooth radio 310 may include a Bluetooth compatible transmitter modulator and a Bluetooth compatible receiver modulator. Bluetooth radio 310 may support the Bluetooth Classic standard or the Bluetooth Low Energy standard, or both. Bluetooth radio 310 is configured to transmit or receive voice or data packets via an antenna.

Processor 306 may include a variety of processors (e.g., digital signal processors), with conventional CPUs or GPUs being applicable. Memory 308 may include a variety of memories, and in one example includes RAM, ROM, flash memory, or a combination thereof. Memory 308 may further include separate memory structures or a single integrated memory structure. One or more components of Bluetooth module 304 may be integrated with components at Bluetooth central controller device 10.

Referring to FIGS. 1, 2A, 2B, and 3, in one example operation, the system link management application program 318 is configured to receive link data 320 associated with wireless links 6a, 6b, 6c, 6d, 6e, 6f . . . 6xx between base stations 2a, 2b, 2c, 2d, 2e, 2f . . . 2xx and client devices 4a, 4b, 4c, 4d, 4e, 4f . . . 4xx, respectively. For example, base station link management application program 218 at the base station 2a is configured to transmit a first wireless link 6a data 322 to the central controller device 10. The first wireless link 6a data 322 is associated with a first wireless link 6a between the base station 2a and the client device 4a. The first wireless link 6a data 322 is included in link data 320 received at the central controller device 10.

System link management application program 318 identifies a global system performance from link data 320 utilizing a link quality parameter. For example, the link quality parameter is a packet error rate, bit error rate, carrier-to-interference (C/I) ratio, or received signal strength indicator (RSSI). In a further example, the link quality parameter is any audio quality parameter determined from analysis of the actual transmitted audio. For example, Perceptual Evaluation of Speech Quality (PESQ) or Perceptual Objective Listening Quality Analysis (POLQA) may be used.

In one example, to identify the global system performance, system link management application program 318 generates a cumulative distribution function of wireless links 6a, 6b, 6c, 6d, 6e, 6f . . . 6xx with respect to the link quality parameter. System link management application program 318 then identifies a percentage of wireless links 6a, 6b, 6c, 6d, 6e, 6f . . . 6xx having an acceptable or good link quality. To identify the percentage of wireless links 6a, 6b, 6c, 6d, 6e, 6f . . . 6xx having the acceptable or good link quality, system link management application program 318 determines the percentage of wireless links 6a, 6b, 6c, 6d, 6e, 6f . . . 6xx having a value of the link quality parameter less than a predetermined threshold value. For example, where the link quality parameter is the packet error rate (PER), a threshold value of 1% may be used, below which is considered a good link quality. A threshold value of 0.1% may be used, below which is considered a very good link quality.

Alternatively or in addition to, system link management application program 318 identifies a percentage of wireless links 6a, 6b, 6c, 6d, 6e, 6f . . . 6xx having an unacceptable link quality. To identify the percentage of wireless links 6a, 6b, 6c, 6d, 6e, 6f . . . 6xx having the unacceptable link quality, system link management application program 318 determines the percentage of wireless links 6a, 6b, 6c, 6d, 6e, 6f . . . 6xx having a value of the link quality parameter greater than a predetermined threshold value. For example, where the link quality parameter is the packet error rate, a threshold value of 7% may be used, above which is considered an unacceptable poor link quality.

Responsive to the global system performance, system link management application program 318 generates one or more modified link settings for one or more wireless links in wireless links 6a, 6b, 6c, 6d, 6e, 6f . . . 6xx. For example, one or more modified link settings for the wireless link 6a between base station 2a and client device 4a is generated. The one or more modified link settings may be for a forward link from the base station 2a to the client device 4a, a reverse link from the client device 4a to the base station 2a, or for both the forward and reverse link.

In one usage scenario, system link management application program 318 identifies a system having both good links and unacceptable links. In this example scenario, wireless link 6a is identified as a good or acceptable link and wireless link 6b is identified as an unacceptable link. To generate the modified wireless link 6a settings, system link management application program 318 identifies a good or acceptable link quality status of the wireless link 6a and selects a new link setting resulting in a shortened packet length for packets transmitted between the base station 2a and the client device 4a. For example, the new link setting may utilize a higher rate modulation scheme with reduced coding in order to increase channel capacity availability. In contrast, to generate the modified wireless link 6b settings, system link management application program 318 identifies an unacceptable link quality status of the wireless link 6b and selects a new link setting resulting in a lengthened packet length for packets transmitted between the base station 2b and the client device 4b. For example, the new link setting may utilize packet types with less complex modulation, more forward error correction (FEC), possibly lower codec rates in order to increase robustness on the link.

The system link management application program 318 transmits to selected base stations 2a, 2b, 2c, 2d, 2e, 2f . . . 2xx or client devices 4a, 4b, 4c, 4d, 4e, 4f . . . 4xx the one or more modified link settings for the selected wireless links 6a, 6b, 6c, 6d, 6e, 6f . . . 6xx for implementation. The base station link management application program 218 receives from the central controller device 10 one or more modified link settings for the first wireless link 6a between the base station 2a and the client device 4a. The base station link management application program 218 implements the one or more modified link settings at the base station 2. The base station link management application program 218 transmits a data between the base station 2a and the client device 4a over the first wireless link 6a utilizing the one or more modified link settings.

During continued operation, system link management application program 318 at the central controller device 10 is further configured to receive a subsequent first wireless link 6a data 322 associated with the first wireless link 6a between the base station 2a and the client device 4a. This subsequent first wireless link 6a data 322 is received following implementing the one or more modified link settings for the first wireless link 6a at the base station 2. The system link management application program 318 identifies a changed global system performance utilizing the link quality parameter utilizing the subsequent first wireless link 6a data 322. For example, the changed global system performance comprises an improved system performance.

Figure 4:
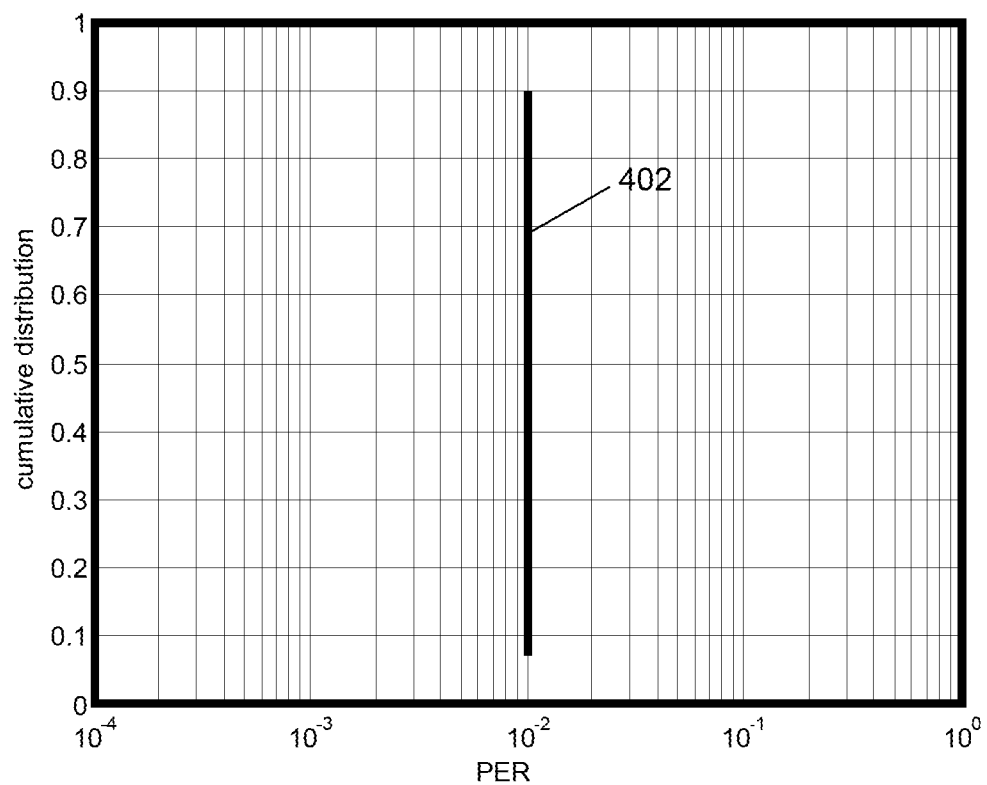
FIG. 4 is a graph of a cumulative distribution function curve generated by system link management application program in one example.

FIG. 4 is a graph 400 of an idealized cumulative distribution function curve 402 generated by system link management application program 318 in one example. For example, system link management application program 318 may set as a desired system performance parameter that all users have a packet error rate (PER) of 1%. This ideal cumulative distribution function (CDF) is shown in FIG. 4. In this example case, the distribution function curve 402 shows that all users have good link performance (i.e., satisfy the desired system performance that every link has a PER of 1%).

Figure 5:
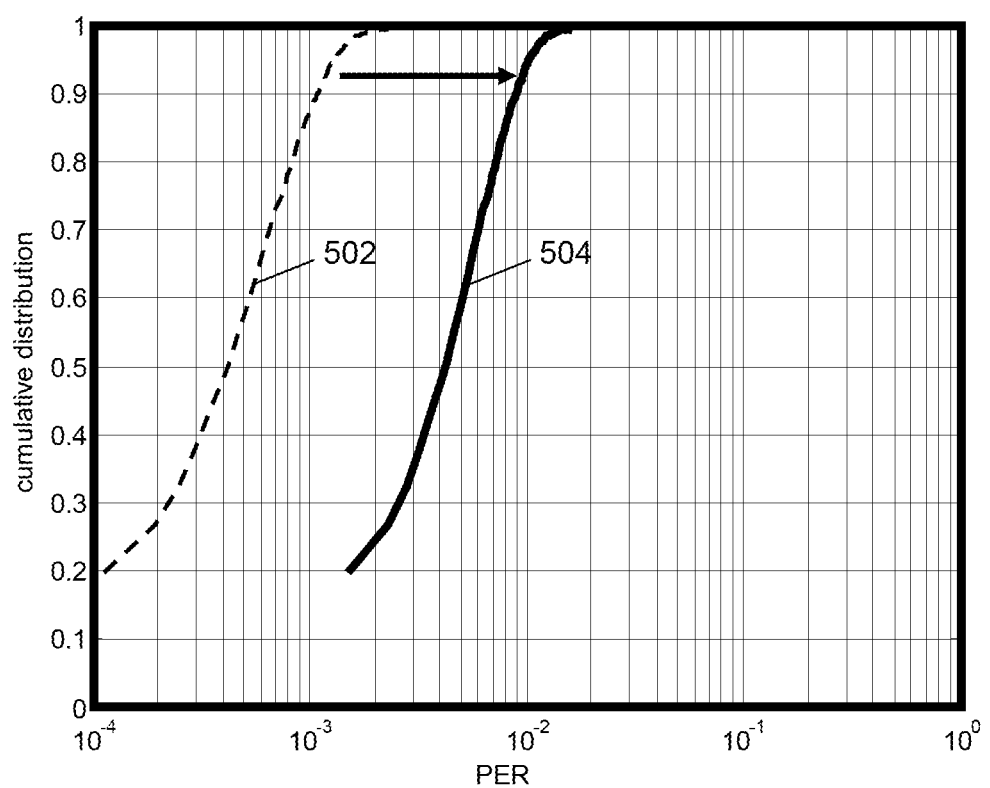
FIG. 5 is a graph of a first distribution function curve and a subsequent second distribution function curve in a further example.

FIG. 5 is a graph 500 of a distribution function curve 502 and a distribution function curve 504 in a further example. Distribution function curve 502 illustrates system performance prior to transmission by system link management application program 318 of modified link parameter settings (i.e., link parameter updates) to one or more of base stations 2a, 2b, 2c, 2d, 2e, 2f . . . 2xx and/or client devices 4a, 4b, 4c, 4d, 4e, 4f . . . 4xx for implementation. Distribution function curve 504 illustrates system performance after implementation of these modified link settings. Both distribution function curve 502 and distribution function curve 504 indicates overall good performance.

Distribution function curve 502 shows that the overall performance of the links is very good: more than 90% have a PER of 0.1% or less. The low interference conditions can be traded off for higher audio quality. For example, the central controller device 10 can tell the units with very good link quality (e.g., 0.1% PER or less), to use a higher rate codec (i.e., less compression), thus providing a higher audio quality. This may increase the traffic load in the system (and thus the mutual interference). To support the higher data rates, packet types can be selected with a more complex modulation scheme (sending more bits per symbol, like moving from BPSK to 8-PSK), and/or have less FEC. This will make the high-quality links more susceptible to interference leading to higher packet errors. When the new parameters have set into effect, the CDF will have moved up like distribution function curve 504 which is closer to the ideal shown in FIG. 4. The benefit is that most, if not all, users have a higher audio quality, while the PER is still acceptable.

Figure 6:
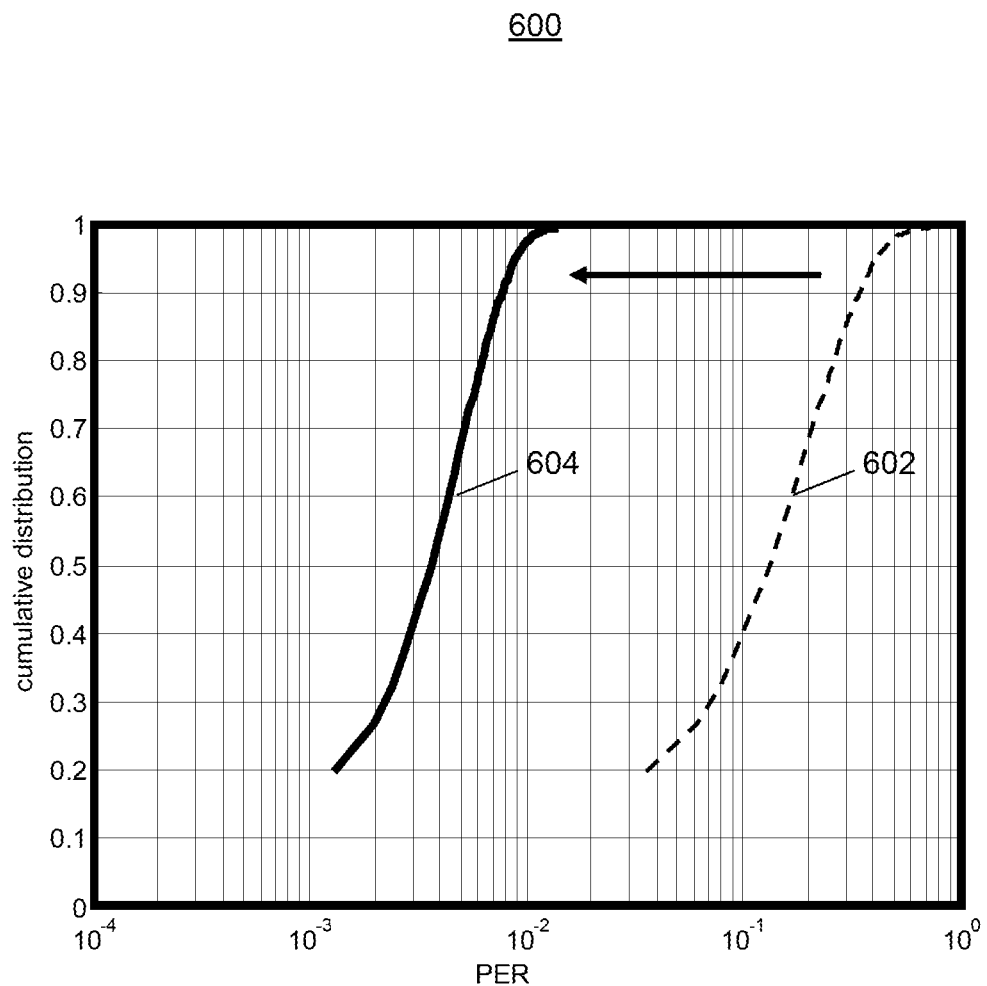
FIG. 6 is a graph of a first distribution function curve and a subsequent second distribution function curve in a further example usage.

FIG. 6 is a graph 600 of a distribution function curve 602 and a distribution function curve 604 in a further example usage. Distribution function curve 602 illustrates system performance prior to transmission by system link management application program 318 of modified link parameter settings (i.e., link parameter updates) to one or more of base stations 2a, 2b, 2c, 2d, 2e, 2f . . . 2xx and/or client devices 4a, 4b, 4c, 4d, 4e, 4f . . . 4xx for implementation.

Distribution function 602 indicates the links all have a bad performance. In this case, the central controller device 10 takes actions opposite of the ones applied for FIG. 5. More interference resilient packet types must be used, like less complex and more robust modulation, more FEC support, shorter packets (resulting in more overhead though). This may lead to the use of lower rate codecs with less inherent audio quality (note that the audio quality perceived depends on the audio compression (assumed lossy) and the errors). Users with the worst performance (upper right corner in distribution function curve 602) are handled by the central controller device 10 first, and get the most intense corrections for the link parameters. When the new parameters have set into effect, the result will be distribution function curve 604. The benefit is that most users now have good performance.

Figure 7:
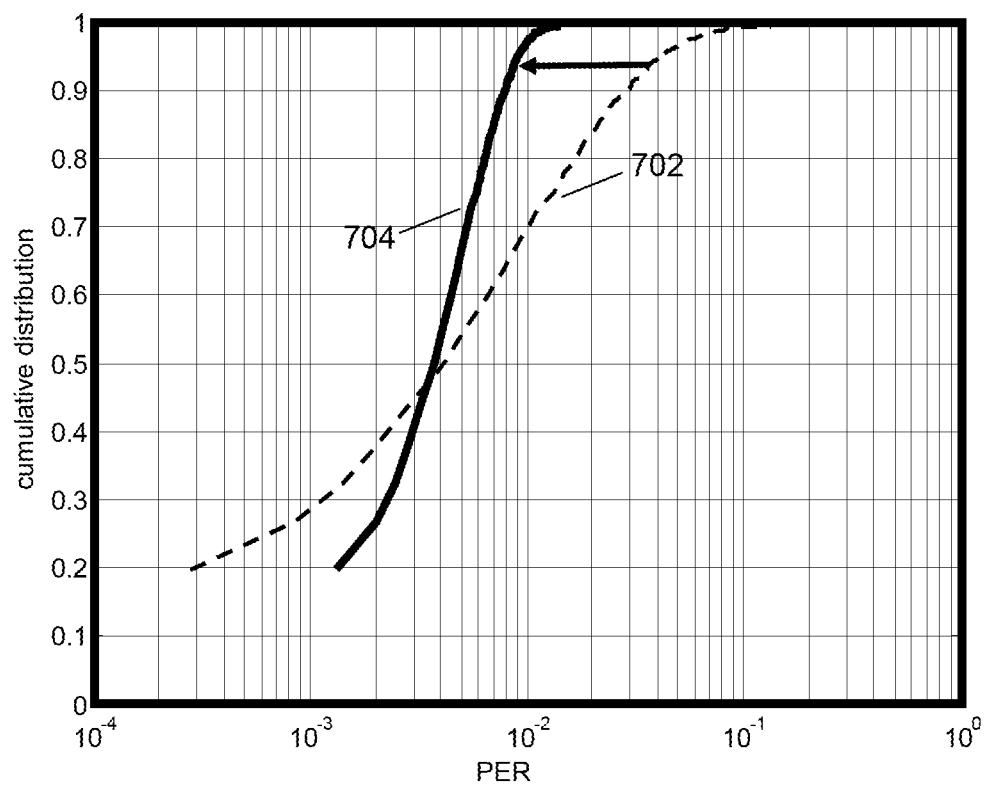
FIG. 7 is a graph of a first distribution function curve and a subsequent second distribution function curve in a further example.

FIG. 7 is a graph 700 of a distribution function curve 702 and a distribution function curve 704 in a further example. Distribution function curve 702 illustrates system performance prior to transmission by system link management application program 318 of modified link parameter settings (i.e., link parameter updates) to one or more of base stations 2a, 2b, 2c, 2d, 2e, 2f . . . 2xx and/or client devices 4a, 4b, 4c, 4d, 4e, 4f . . . 4xx for implementation.

Distribution function curve 702 indicates there is mixed performance in the system whereby there are both a large number of very good links, but also many very bad links. The distribution function curve 702 is less steep relative to prior described examples. In distribution function curve 702, 30% of the links has a PER of more than 1%. At the same time, another 30% has a PER better than 0.1%. The central controller device 10 can send link updates to the very good-link users to create bandwidth (and reduce interference) that will help the bad-link users. For example, the good-link users are ordered to use short packets, i.e. using more complex modulation schemes and without FEC. Or good-link users can be ordered to use audio codecs with lower rate audio codecs (more compression) to free up bandwidth. They can also be instructed to use a lower transmit power, thus producing less interference. Adaptive Tx power control is applied in Bluetooth, but individual in each link based on the RSSI. This type of adaptive power control is distributed control applied locally in each link separately. In contrast, the central controller device 10 may control the Tx power based on global information, the cumulative distribution function. To further improve the distribution curve 702, bad-link users are instructed to improve their robustness, using packet types with less complex modulation, more FEC, possibly requiring lower codec rates. The link parameters provided by the central controller device 10 can be valid for both the forward link (downlink from base to headset) and reverse link (uplink from headset to base) together. In one example, an asymmetric link that is optimized for the environment each receiver is in is utilized. When the new parameters have set into effect, the result will be distribution function curve 704. The benefit is that most users now have good performance. For example, in the new distribution curve 704, the percentage of dissatisfied users (i.e. users with a PER of 1% or more) has reduced from 30% to 3%.

Figure 8:
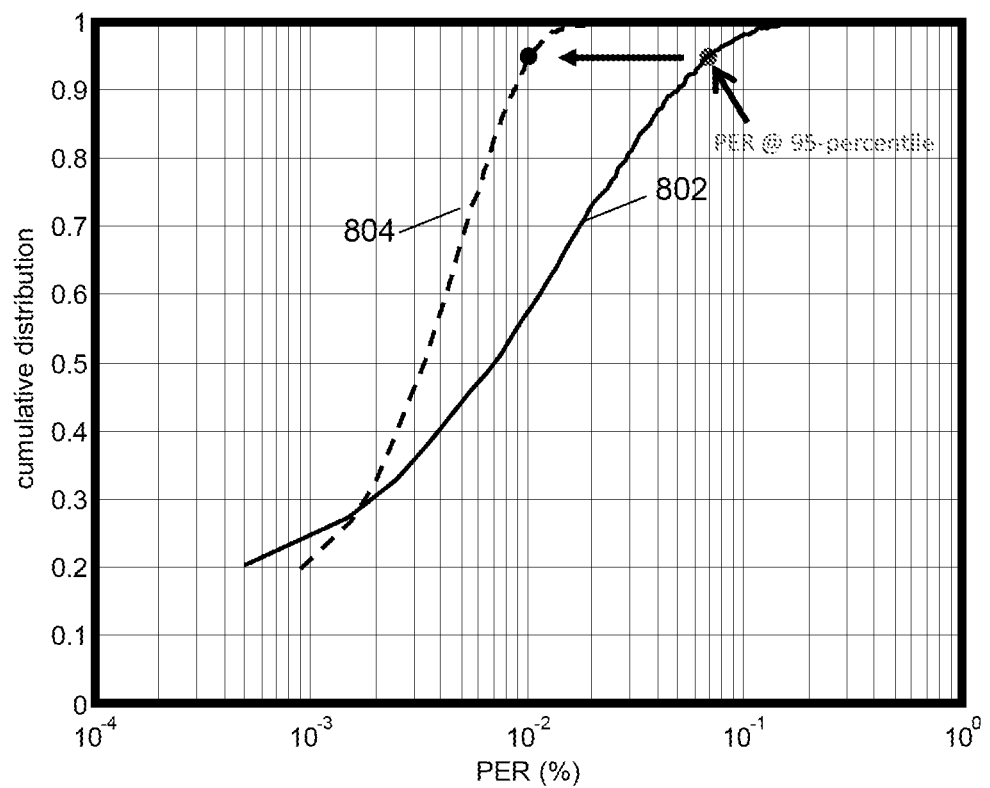
FIG. 8 is a graph of a first distribution function curve and a subsequent second distribution function curve in a further example.

FIG. 8 is a graph 800 of a distribution function curve 802 and a distribution function curve 804 in a further example. Distribution function curve 802 illustrates system performance prior to transmission by system link management application program 318 of modified link parameter settings (i.e., link parameter updates) to one or more of base stations 2a, 2b, 2c, 2d, 2e, 2f . . . 2xx and/or client devices 4a, 4b, 4c, 4d, 4e, 4f . . . 4xx for implementation.

Distribution function curve 802 indicates there is mixed performance in the system. Distribution function curve 802 is the result of the data gathered in the central controller device 10 showing the distribution of PER over the different (local) links between client devices and base stations. At the 95-percentile, a PER of 7% is observed, meaning that 5% of the users have a PER of 7% or higher. This could be considered too high. The central controller device 10 then examines the collective data provided by the client devices and base stations. For example, it could identify which client devices are very close to their base stations and experience a very high RSSI (and good quality link so a PER far below 1%). For these client devices, the central controller device 10 may advise to use a very high-rate modulation scheme with little coding, resulting in very short packets. As a result, capacity is freed up and interference is reduced which will benefit the users that experience a PER of 7%. As an option, the central controller device 10 may advise client devices with poor performance (7% PER of more) to use a more robust link type that can withstand more interference and a voice codec that is more robust to interference. The central controller device 10 may thus send new configuration data to each headset and base station, which will impact the statistics in such a way that more users have an acceptable performance, resulting in distribution function curve 804. Apart from a shift, it is noticed that the distribution function curve 804 may also be steeper, meaning that there are less users with over-qualified performance (like a PER below 0.01%). So the available capacity is better divided over all users.

In general, users with very good performance are advised by the central controller device 10 to use settings that require less channel capacity but which may result in slightly higher PER (or higher latency or lower quality voice). In contrast, users with bad performance are advised by the central controller device 10 to use settings that make the link more robust, even if a little more channel capacity is needed.

When there are too many users in the shared space to reach acceptable performance for everybody, the central controller device 10 may decide to deny service to one or more client devices (apparently, the system is overloaded). Conversely, when the number of active users low, the central controller device 10 may advise the client devices (and/or bases) to use settings that use a large channel capacity and provide high quality (e.g. wideband) voice.

The algorithm residing in the central controller for setting the link parameters is adaptive and iterative. As the link parameters are changed, new distribution functions can be formed by the new measurements provided to the central controller. Also the number of active users may change over time. Base stations 2xx and/or headsets 4xx continuously determine the PER/BER during active links (for example over a time period of 5 seconds) and report that to the central controller 10. The central controller 10 collects the PER data over a period of say 5 minutes, bins the data, and derives distribution functions. Based on the distribution functions, link parameters in the base stations 2xx and headsets 4xx may be changed, resulting in new PER data. Again, this PER data (collected over a period of 5 minutes) is binned by the central controller and new distribution functions are derived. This may lead to new link parameter settings. The system will also adapt to changes in the environment, like when additional base stations 2xx are placed or base stations 2xx are moved, and to the traffic intensity, i.e. when more or less users become active, or when more alternative traffic is generated (like WiFi, or other technologies reusing the same radio spectrum).

In all previous examples, client device 4xx may not have a direct wireless link to the central controller 10, but will use the associated base station 2xx as a relay. That is, link data present in the client device 4xx is sent to base station 2xx which in turn forwards this data to central controller 10. Likewise, client device 4xx link settings as ordered by the central controller are sent to base station 2xx which in turn forwards these link setting to client device 4xx.

In various embodiments, the techniques of FIG. 9 discussed below may be implemented as sequences of instructions executed by one or more electronic systems. For example, one or more electronic systems as shown in FIGS. 1, 2A-2B, and 3 are utilized.

Figure 9:
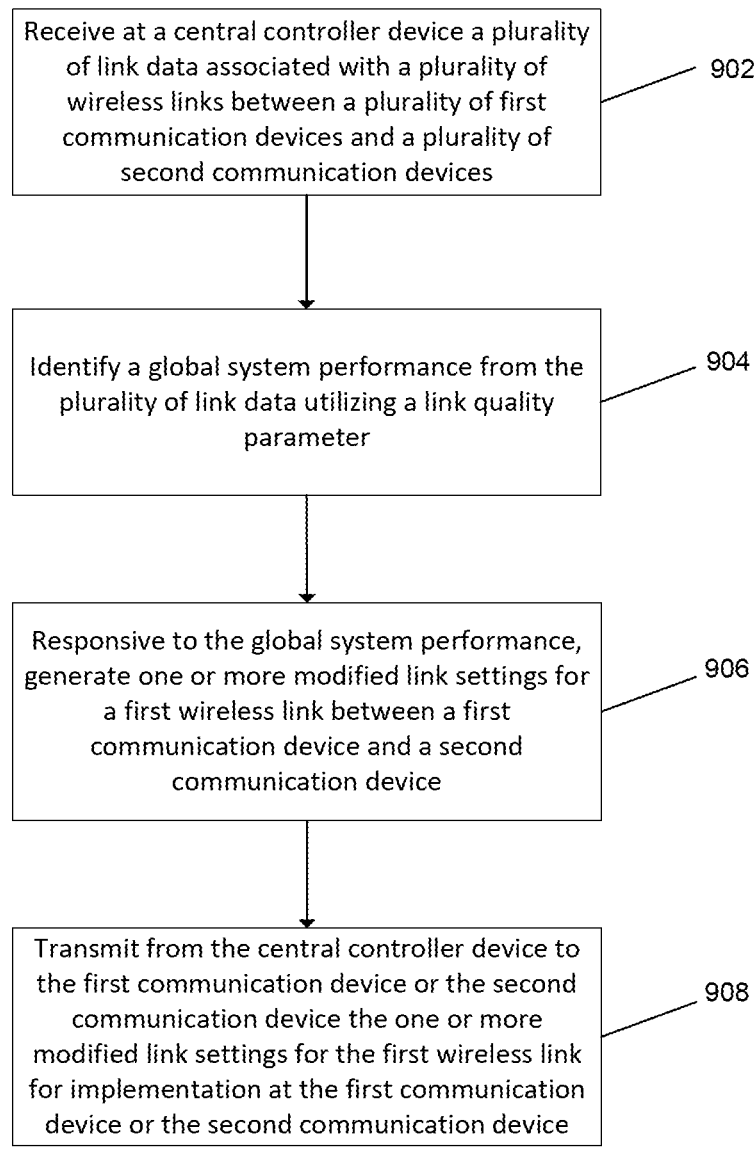
FIG. 9 is a flow diagram illustrating wireless link management using a central controller in one example.

FIG. 9 is a flow diagram illustrating wireless link management using a central controller in one example. At block 902, a plurality of link data associated with a plurality of wireless links between a plurality of first communication devices (e.g., base stations) and a plurality of second communication devices (e.g., client devices, such as wireless headsets) is received at a central controller device. In one example, the plurality of link data includes a link settings data associated with a link parameter and a link quality data associated with the link quality parameter. For example, the link settings data includes settings associated with an audio codec, a data packet type, a modulation scheme, a used transmit power, or an adaptive frequency hop parameter. For example, the link quality data includes a received signal strength indicator (RSSI) data, a packet error rate (PER) data, a bit error rate data (BER), or a carrier-to-interference (C/I) data. In one example, the plurality of wireless links are short-range wireless links and may be a plurality of Bluetooth communications links, Digital Enhanced Cordless Telecommunications (DECT) links, or IEEE 802.11 (WiFi) links.

At block 904, a global system performance is identified from the plurality of link data utilizing a link quality parameter, such as a packet error rate or bit error rate. In one example, identifying the global system performance from the plurality of link data utilizing the link quality parameter includes generating a distribution function of the plurality of wireless links with respect to the link quality parameter. A percentage of the plurality of wireless links having an acceptable or good link quality is identified or a percentage of the plurality of wireless links having an unacceptable link quality is identified. Identifying the percentage of the plurality of wireless links having the acceptable or good link quality may include determining the percentage of the plurality of wireless links having a value of the link quality parameter less than a threshold value. Identifying the percentage of the plurality of wireless links having an unacceptable link quality may include determining the percentage of the plurality of wireless links having a value of the link quality parameter greater than the threshold value.

At block 906, responsive to the global system performance, one or more modified link settings are generated for a first wireless link between a base station and a client device. The base station is selected from the plurality of base stations, and the client device is selected from the plurality of client devices.

In one example, generating one or more modified link settings for the first wireless link between the base station and the client device includes identifying a good or acceptable link quality status of the first wireless link. A new link setting is selected resulting in a shortened packet length for packets transmitted between the base station and the client device. In one example, generating one or more modified link settings for the first wireless link between the base station and the client device includes identifying an unacceptable link quality status of the first wireless link. A new link setting is selected resulting in a lengthened packet length for packets transmitted between the base station and the client device.

At block 908, the one or more modified link settings for the first wireless link are transmitted from the central controller device to the base station or the client device for implementation. The one or more modified link settings are then implemented at the base station or the client device.

In one example, the method further includes receiving at the central controller device a subsequent first wireless link data associated with the first wireless link between the base station and the client device, the subsequent first wireless link data received following implementing the one or more modified link settings for the first wireless link at the base station or the client device. A changed global system performance is identified utilizing the link quality parameter utilizing the subsequent first wireless link data. For example, the changed global system performance is an improved system performance.

In one example, the method further includes generating one or more modified link settings for a selected two or more wireless links selected from the plurality of wireless links responsive to identifying the global system performance. The one or more modified link settings for the selected two or more wireless links are transmitted from the central controller device for implementation at two or more base stations or two or more client devices While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method for wireless link management comprising:
   receiving at a central controller device a plurality of link data associated with a plurality of wireless links between a plurality of base devices and a plurality of client devices, wherein each base device in the plurality of base devices is associated in a one-to-one relationship with a single client device in the plurality of client devices, and wherein each base device and the single client device in the one-to-one relationship are associated with a single user;
   identifying a global system performance from the plurality of link data utilizing a link quality parameter;
   responsive to the global system performance, generating one or more modified link settings for a first wireless link between a base device and a client device, the base device selected from the plurality of base devices and the client device selected from the plurality of client devices; and
   transmitting from the central controller device to the base device or the client device the one or more modified link settings for the first wireless link for implementation at the base device or the client device.

2. The method of claim 1, wherein the plurality of client devices comprises a plurality of wireless headsets.

3. The method of claim 1, further comprising: implementing the one or more modified link settings for the first wireless link at the base device or the client device.

4. The method of claim 3, further comprising:
   receiving at the central controller device a subsequent first wireless link data associated with the first wireless link between the base device and the client device, the subsequent first wireless link data received following implementing the one or more modified link settings for the first wireless link at the base device or the client device;
   identifying a changed global system performance utilizing the link quality parameter utilizing the subsequent first wireless link data.

5. The method of claim 1, further comprising:
   generating one or more modified link settings for a selected two or more wireless links selected from the plurality of wireless links responsive to identifying the global system performance; and
   transmitting from the central controller device the one or more modified link settings for the selected two or more wireless links for implementation at two or more base devices or two or more client devices.

6. The method of claim 1, wherein the plurality of wireless links are short-range wireless links and comprise a plurality of Bluetooth communications links, Digital Enhanced Cordless Telecommunications (DECT) links, or IEEE 802.11 (WiFi) links.

7. The method of claim 1, wherein the plurality of link data comprises a link settings data associated with a link parameter and a link quality data associated with the link quality parameter.

8. The method of claim 7, wherein the link settings data comprises settings associated with an audio codec, a data packet type, a modulation scheme, a used transmit power, or an adaptive frequency hop parameter.

9. The method of claim 7, wherein the link quality data comprises a received signal strength indicator (RSSI) data, a packet error rate (PER) data, a bit error rate data (BER), a carrier-to-interference (C/I) data, or a data determined from analysis of an audio data.

10. The method of claim 1, wherein identifying the global system performance from the plurality of link data utilizing the link quality parameter comprises:
    generating a distribution function of the plurality of wireless links with respect to the link quality parameter;

identifying a first percentage of the plurality of wireless links having an acceptable or good link quality or identifying a second percentage of the plurality of wireless links having an unacceptable link quality.

11. The method of claim 10, wherein identifying the first percentage of the plurality of wireless links having the acceptable or good link quality comprises determining the first percentage of the plurality of wireless links having a first value of the link quality parameter less than a threshold value, or identifying the second percentage of the plurality of wireless links having the unacceptable link quality comprises determining the second percentage of the plurality of wireless links having a second value of the link quality parameter greater than the threshold value.

12. The method of claim 1, wherein generating one or more modified link settings for the first wireless link between the base device and the client device comprises:
   identifying a good or acceptable link quality status of the first wireless link; and
   selecting a new link setting resulting in a shortened packet length for packets transmitted between the base device and the client device.

13. The method of claim 1, wherein generating one or more modified link settings for the first wireless link between the base device and the client device comprises:
   identifying an unacceptable link quality status of the first wireless link; and
   selecting a new link setting resulting in a lengthened packet length for packets transmitted between the base device and the client device.

14. The method of claim 1, wherein the one or more modified link settings for the first wireless link between the base device and the client device comprises a modified link setting for a forward link from the base device to the client device.

15. The method of claim 1, further comprising repeatedly performing:
   receiving at the central controller device the plurality of link data, identifying the global system performance, responsive to the global system performance generating one or more modified link settings for the first wireless link, and transmitting from the central controller device to the base device or the client device the one or more modified link settings.

16. A system comprising:
   a central controller device comprising:
      a central controller processor;
      a central controller wireless transceiver;
      a central controller antenna;
      a central controller memory storing one or more system link management applications executable by the central controller processor, the one or more system link management applications comprising instructions to:
         receive a plurality of link data associated with a plurality of wireless links between a plurality of base devices and a plurality of client devices, wherein each base device in the plurality of base devices is associated in a one-to-one relationship with a single client device in the plurality of client devices, and wherein each base device and the single client device in the one-to-one relationship are associated with a single user;
         identify a global system performance from the plurality of link data utilizing a link quality parameter; and
         responsive to the global system performance, generate one or more modified link settings for one or more wireless links in the plurality of wireless links; and
   a base device selected from the plurality of base devices comprising:
      a base device processor;
      one or more base device wireless transceivers configured for wireless communications with the central controller device and a client device, the client device included in the plurality of client devices;
      a base device antenna; and
      a base device memory storing one or more base device link management applications executable by the base device processor, the one or more base device link management applications comprising instructions to:
         transmit a first wireless link data to the central controller device, the first wireless link data associated with a first wireless link between the base device and the client device, wherein the first wireless link data is included in the plurality of link data received at the central controller device;
         receive from the central controller device one or more modified link settings for the first wireless link between the base device and the client device;
         implement the one or more modified link settings at the base device; and
         transmit a data between the base device and the client device over the first wireless link utilizing the one or more modified link settings.

17. The system of claim 16, wherein the client device comprises a wireless headset corresponding to the base device.

18. The system of claim 16, wherein the one or more system link management applications at the central controller device comprise further instructions to:
   receive a subsequent first wireless link data associated with the first wireless link between the base device and the client device, the subsequent first wireless link data received following implementing the one or more modified link settings for the first wireless link at the base device;
   identify a changed global system performance utilizing the link quality parameter utilizing the subsequent first wireless link data.

19. The system of claim 16, wherein the one or more system link management applications at the central controller device comprise further instructions to:
   transmit from the central controller device to the plurality of base devices or the plurality of client devices the one or more modified link settings for the plurality of wireless links for implementation at the plurality of base devices or the plurality of client devices.

20. The system of claim 16, wherein the plurality of link data comprises a link settings data associated with a link parameter and a link quality data associated with the link quality parameter.

21. The system of claim 20, wherein the link settings data comprises settings associated with an audio codec, a data packet type, a modulation scheme, a used transmit power, or an adaptive frequency hop parameter.

22. The system of claim 20, wherein the link quality data comprises a received signal strength indicator (RSSI) data, a packet error rate (PER) data, a bit error rate data (BER), a carrier-to-interference (C/I) data, or a data determined from analysis of an audio data.

23. The system of claim 16, wherein instructions to identify the global system performance from the plurality of link data utilizing the link quality parameter at the central controller device comprise instructions to:
  generate a distribution function of the plurality of wireless links with respect to the link quality parameter;
  identify a first percentage of the plurality of wireless links having an acceptable or good link quality or identifying a second percentage of the plurality of wireless links having an unacceptable link quality.

24. The system of claim 16, wherein instructions to generate one or more modified link settings for one or more wireless links at the central controller device comprise instructions to generate one or more modified link settings for the first wireless link between the base device and the client device.

25. The system of claim 24, wherein instructions to generate one or more modified link settings for the first wireless link between the base device and the client device comprise instructions to:
  identify a good or acceptable link quality status of the first wireless link; and
  select a new link setting resulting in a shortened packet length for packets transmitted between the base device and the client device.

26. The system of claim 24, wherein instructions to generate one or more modified link settings for the first wireless link between the base device and the client device comprise instructions to:
  identify an unacceptable link quality status of the first wireless link; and
  select a new link setting resulting in a lengthened packet length for packets transmitted between the base device and the client device.

27. The system of claim 16, wherein the base device forwards the one or more modified link settings received from the central controller device to the client device; wherein the one or more modified link settings at the client device are implemented in the client device.

28. A method for wireless link management comprising:
  transmitting a first wireless link data to a central controller device, the first wireless link data associated with a first wireless link between a base device and a client device, wherein the first wireless link data is included in a plurality of link data received at the central controller device, and wherein the base device is one of a plurality of base devices and the client device is one of a plurality of client devices, and wherein each base device in the plurality of base devices is associated in a one-to-one relationship with a single client device in the plurality of client devices, and wherein each base device and the single client device in the one-to-one relationship are associated with a single user;
  receiving from the central controller device one or more modified link settings for the first wireless link between the base device and the client device, the one or more modified link settings generated responsive to identifying a global system performance from the plurality of link data;
  implementing the one or more modified link settings at the base device; and
  transmitting a data between the base device and the client device over the first wireless link utilizing the one or more modified link settings.

29. The method of claim 28, wherein the client device comprises a wireless headset corresponding to the base device.

30. The method of claim 28, wherein the plurality of link data comprises a link settings data associated with a link parameter and a link quality data associated with a link quality parameter.

* * * * *